(12) United States Patent
Kurokawa

(10) Patent No.: US 6,330,295 B1
(45) Date of Patent: Dec. 11, 2001

(54) DATA PROCESSING SYSTEM AND DATA PROCESSING METHOD

(75) Inventor: Masuyoshi Kurokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/083,890

(22) Filed: May 21, 1998

(30) Foreign Application Priority Data

May 27, 1997 (JP) ................................................. 9-136443

(51) Int. Cl.[7] ........................................................ H04L 7/00
(52) U.S. Cl. .......................................... 375/354; 382/304
(58) Field of Search ............................. 375/354; 382/304, 382/250, 303; 348/422, 721; 358/443, 447; 708/521, 524

(56) References Cited

U.S. PATENT DOCUMENTS 5,715,436 * 2/1998 Kawai et al. ........................ 395/505
5,790,879 * 8/1998 Wu .................................. 395/800.19
5,926,583 * 7/1999 Iwase et al. ........................ 382/304

* cited by examiner

*Primary Examiner*—Don N. Vo
(74) *Attorney, Agent, or Firm*—Frommer Lawrence & Haug LLP; William S. Frommer; Joe H. Shallenburger

(57) ABSTRACT

Disclosed is data processing carried out by an SIMD (Single Instruction stream/Multiple Data stream) parallel processor. When the piece count of pixel data increases, another data processing apparatus is newly added to an existing data processing apparatus. Early M pieces of pixel data of an input signal is processed by the existing data processing apparatus whereas later M pieces of pixel data of the input signal is processed by the other data processing apparatus. An input pointer generating circuit employed in the other data processing apparatus is used to prevent the early M pieces of pixel data from being supplied to the other data processing apparatus by delaying the generation of an input pointer. A select signal generating circuit outputs a select signal to a selector for properly selecting either results of processing output by an output SAM unit employed in the existing data processing apparatus or results of processing output by an output SAM unit employed in the other data processing apparatus.

5 Claims, 8 Drawing Sheets

FIG. 9

| | | | | | | | | | | | |
|---|---|---|---|---|---|---|---|---|---|---|---|
| 2nd DATA PROCESSING APPARATUS 1 | Q1, Q2, Q3, Q4, Q5, Q6, Q7, Q8, Q9, Q10 | | | | | | | | | | |
| 1st DATA PROCESSING APPARATUS 2 | | | | | | Q7, Q8, Q9, Q10, Q11, Q12, Q13, Q14, Q15, Q16 | | | | | |
| SELECT SIGNAL | 0, | 0, | 0, | 0, | 0, | 0, | 1, | 1, | 1, | 1, | 1, |

DATA PROCESSING SYSTEM AND DATA PROCESSING METHOD

BACKGROUND OF THE INVENTION

The present invention relates to a data processing system and a data processing method adopted in the data processing system, and particularly to a data processing system and a data processing method adopted in the data processing system which are capable of keeping up with a case in which the piece count of pixel data to be processed increases by delaying the operating timing of input and output units employed in the data processing system.

As a related art data processing system, there is known a processor called an SVP (Serial Video Processor) described in Section 3.1 on Page 17 of the IEEE 1990 Custom Integrated Circuits Conference. Composed of 1,024 processors integrated in a single chip, the SVP is a processor for carrying out real time digital processing on a video signal. The SVP has an SIMD (Single Instruction stream/Multiple Data stream) structure which allows pixel data on a horizontal scanning line to be processed concurrently. SIMD is the name of one of data processing methods adopted by a computer whereby data of different kinds is processed concurrently as if the data pertained to one job.

FIG. 1 is a block diagram showing a typical configuration of an SIMD control parallel processor. As shown in the figure, the SIMD control parallel processor includes a program control apparatus 17, an input SAM (Serial Access Memory) unit 11, a data memory unit 12, a processing circuit unit 13 and an output SAM unit 14.

The input SAM unit 11, the data memory unit 12, the processing circuit unit 13 and the output SAM unit 14 constitute a group of parallel processor elements 15 arranged in a linear array. The processor elements 15 are controlled in a state being interlocked with each other in accordance with a program of the program control apparatus 17, that is, subjected to the SIMD control. The program control apparatus 17 includes a program memory for storing the program in advance and a sequence control circuit for carrying on the program. The program control apparatus 17 generates a variety of control signals in accordance with the program in order to control a variety of circuits.

It should be noted that the input SAM unit 11, the data memory unit 12, and the output SAM unit 14 are each implemented as a memory, detailed explanation of which is omitted. In an apparatus shown in FIG. 1, row address decoders for these memories are included in the program control apparatus 17.

One processor element 15 is represented by a hatched block in FIG. 1. A plurality of processor elements 15 are arranged in parallel, that is, in the horizontal direction of the figure. That is to say, the processor element 15 indicated by the hatch block includes components of one processor.

Next, the operation of the linear array parallel processor for carrying out video processing shown in FIG. 1 will be described.

Input data, strictly speaking, video data of one pixel, is supplied to the input SAM unit 11 in accordance with a control signal output by the program control apparatus 17. The processor elements 15 from the leftmost one to the rightmost one shown in the figure sequentially process the data. That is to say, pieces of input data are supplied sequentially to input SAM cells of the input SAM unit 11 from the leftmost one to the rightmost one shown in the figure.

Since the number of the processor elements 15 is at least equal to the pixel count H in one horizontal scanning period of a video signal, pixel data of one horizontal scanning period of a video signal can be accommodated in the input SAM unit 11. The operation to supply input data is repeated for each horizontal scanning period.

Each time data of one horizontal scanning period of a video signal is accumulated in the input SAM unit 11 as described above, the program control apparatus 17 carries out processing by executing SIMD control on the input SAM unit 11, the data memory unit 12, the processing circuit unit 13 and the output SAM unit 14 in accordance with the program as described below. In addition, the SIMD control causes the following operations to be executed in all the processor elements 15 concurrently in the same way.

The input data of one horizontal scanning period of a video signal accumulated in the input SAM unit 11 is, if necessary, transferred from the input SAM unit 11 to the data memory unit 12 during the next horizontal scanning fly-back line period to be used in the subsequent processing.

In a transfer of data from the input SAM unit 11 to the data memory unit 12, the program control apparatus 17 makes an access to data of a predetermined bit count in the input SAM unit 11 selected by an input SAM read signal, and then outputs a memory access signal to write the data into a predetermined memory cell of the data memory unit 12.

Next, the program control apparatus 17 supplies data stored in the data memory unit 12 of each processor element 15 to the processing circuit unit 13 of the processor element 15 in accordance with the program and lets the processing circuit unit 13 carry out arithmetic and logic processing on the data supplied thereto. Results of processing are then written at a predetermined address of the data memory unit 12.

FIG. 2 is a block diagram showing a typical configuration of the processing circuit unit 13. Pieces of data from the data memory unit 12 are supplied to a register 84 by way of a selector 80, a register 85 by way of a selector 81 and a register 86 by way of a selector 82. The selector 80 selects the value 1 set in advance, the piece of data output by the data memory unit 12 or data stored in the register 84 and outputs the selected one to the register 84. The selector 80 selects one of the three inputs in accordance with a signal generated by the program control apparatus 17. A register 87 is used for storing data representing a carry-over generated by a full adder 91.

A logical product circuit 88 computes a logical product of the data stored in the register 84 and data stored in the register 85. An exclusive logical sum circuit 89 computes an exclusive logical sum of data output by the logical product circuit 88 and data supplied by the program control apparatus 17 and supplies the exclusive logical sum to the full adder 91. The full adder 91 also receives data stored in the register 86 and data stored in a register 87. The full adder 91 computes the sum of these three inputs, outputting the sum and its carry-over to a selector 92. The carry-over is also supplied to the register 87 by way of the selector 83.

A selector 90 selects either the data output by the register 85 or data output by the register 86 and outputs the selected one to the selector 92. The selector 92 selects one of three inputs thereof, that is, the data output by the selector 90, the sum output by the full adder 91 or the carry-over also output by the full adder 91, and outputs the selected one to the data memory unit 12. Signals generated by the program control apparatus 17 control how the selectors 90 and 92 select one of their inputs.

Assume that, for example, a signal generated by the program control apparatus 17 controls the selector 80 to let the selector 80 select the value 1 to be stored in the register 84. In this case, since the logic value 1 is stored in the register 84, data stored in the register 85 from the data memory unit 12 passes through the logical product circuit 88 as it is, entering the full adder 91 by way of the exclusive sum circuit 89. The full adder 91 computes the sum of the data supplied from the register 85 by way of the exclusive logical circuit 89, data stored in the register 86 from the data memory unit 12 and data representing a carry-over generated in previous processing and stored in the register 87. The sum and a newly generated carry-over are output to the selector 92. The carry-over is supplied to the register 87 through to be stored therein by way of the selector 83.

The program control apparatus 17 is also capable of controlling the selector 92 to select the carry-over generated by the full adder 91 to be output to the data memory unit 12. In addition, the program control apparatus 17 is also capable of controlling the selector 90 to select either the data output by the register 85 or data output by the register 86 to be output to data memory unit 12 by way of the selector 92 which is also controlled thereby to select the data selected by the selector 90.

When it is desired to supply data output by the logical product circuit 88 to the full adder 91 by logically inverting the data, the program control apparatus 17 outputs the logic value 1 to the exclusive sum circuit 89 as one of the inputs thereof. With the logic value 1 supplied to the exclusive sum circuit 89 as one of the inputs thereof, the exclusive sum circuit 89 will pass on a logic value 1 received from the logical product circuit 88 as a logic value 0 and pass on a logic value 0 received from the logical product circuit 88 as a logic value 1.

When it is desired to compute a logical product of newly input data and immediately previous data, the program control apparatus 17 controls the selector 80 to again select data stored in the register 84. With the selector 80 again selecting the data stored in the register 84, the logical product circuit 88 receives the current data and the immediately previous data and computes their logical product because the current data is stored in the register 85. By controlling the selector 80 to select the output of the register 84 repeatedly, processing can be carried out on new input data and previous input data.

When processing allocated to a one horizontal scanning period as described above is finished, data processed in the one horizontal scanning period is transferred to the output SAM unit 14 by the end of the one horizontal scanning period.

As described above, transfers of input data stored in the input SAM unit 11 to the data memory unit 12, processing of the data carried out by the processing circuit unit 13 and transfers of processing results to the output SAM unit 14 during the one horizontal scanning period are executed in accordance with the SIMD control program in bit units. These pieces of arithmetic/logic processing are carried out repeatedly with one horizontal scanning period of the video signal taken as a unit.

The data transferred to the output SAM unit 14 is further output from the output SAM unit 14 in the next horizontal scanning period.

As described above, three pieces of processing are carried out on each piece of input data. The three pieces of processing are the input processing to write input data into the input SAM unit 11, the arithmetic/logic processing controlled by the program control apparatus 17 and the output processing to output results of processing from the output SAM unit 14. The arithmetic/logic processing controlled by the program control apparatus 17 includes transfers of input data stored in the input SAM unit 11 to the data memory unit 12, processing of the data carried out by the processing circuit unit 13 and transfers of processing results to the output SAM unit 14. It should be noted that the three pieces of processing are executed as pipeline processing with one horizontal scanning period of the video signal taken as a unit.

Pay attention to data input in one horizontal scanning period. Typically, it takes as much time as about one horizontal scanning period to complete each of the three pieces of processing. Thus, in order to complete the three pieces of processing for the data, it takes as much time as about three horizontal scanning periods. Since the three pieces of processing are pipeline processing which is carried out concurrently, that is, processing wherein the 2nd piece of processing for data of the current horizontal scanning period is carried out concurrently with the 1st piece of processing for data of the following horizontal scanning period, however, it takes as much time as only about one horizontal scanning period to complete the three pieces of processing for data of one horizontal scanning period on the average.

In the related art data processing apparatus, pixels of one horizontal scanning period of a video signal are distributed among processor elements each for processing pixel data. However, there are a variety of formats for several hundreds to several thousands of pixels included in one horizontal scanning line of a video signal. Therefore, a data processing apparatus has to include a sufficient number of processor elements for handling a possible maximum piece count of pixel data. When such a data processing apparatus handles a video signal with few pixels, however, there is raised a problem that consumed electric power is much wasted.

In addition, when the number of processor elements is too small for handing pixels included in one horizontal scanning line, the horizontal scanning line is split and distributed among a plurality of data processor elements. In this case, however, a processor element allocated to data on one side of a pixel split boundary may have to exchange data with a processor element in another data processing apparatus allocated to data on the other side of the boundary.

If the data processing apparatus is implemented as a semiconductor chip, there is raised a problem that such exchanges of data lead to a reduced processing speed.

SUMMARY OF THE INVENTION

An object of the present invention is to provide a data processing system that is capable of keeping up with data having a variety of sizes so as to prevent the processing speed from being lowered.

To achieve the above object, according to a first aspect of the present invention, there is provided a data processing system including data processing apparatuses each having a plurality of processing elements, each of the processing elements including an input unit for inputting input serial data, a processing unit for processing data input by the input unit, and an output unit for outputting results of processing carried out by the processing unit, the data processing system including: an input delaying means for causing an operation carried out by the input unit employed in a 1st one of the data processing apparatuses for inputting serial data to lag behind an operation carried out by the input unit employed in a 2nd one of the data processing apparatuses for inputting serial data; and an output delaying means for causing an operation carried out by the output unit employed in the 1st data processing apparatus for outputting serial data to lag behind an operation carried out by the output unit employed in the 2nd data processing apparatus for outputting serial data.

According to a second aspect of the present invention, there is provided a data processing method to be adopted in a data processing system including a plurality of data processing apparatuses each having a plurality of processing elements, each of the processing elements including an input unit for inputting input serial data, a processing unit for processing data input by the input unit; and an output unit for outputting results of processing carried out by the processing unit, the data processing method including the steps of: causing an operation carried out by the input unit employed in a 1st one of the data processing apparatuses for inputting serial data to lag behind an operation carried out by the input unit employed in a 2nd one of the data processing apparatuses for inputting serial data; and causing an operation carried out by the output unit employed in the 1st data processing apparatus for outputting serial data to lag behind an operation carried out by the output unit employed in the 2nd data processing apparatus for outputting serial data. With this configuration, for example, the input and out operations of data in the first data processing apparatus can be started after completion of the input and output operations of data of the second processing apparatus.

According to the data processing system and the data processing method of the present invention, an increased piece count N of data at one stage can be coped with by properly increasing the number of data processing apparatuses for processing the data. Thus, it is no longer necessary to provide a data processing apparatus with a processing performance higher than required in advance. As a result, a data processing system with a simple configuration can be implemented at a low cost.

BRIEF DESCRIPTION OF THE DRAWINGS

FIG. 9 is a timing diagram illustrating the data processing system shown in FIG. 3.

DETAILED DESCRIPTION OF THE PREFERRED EMBODIMENT

Hereinafter, one embodiment of the present invention will be described with reference to the accompanying drawings.

Figure 2:
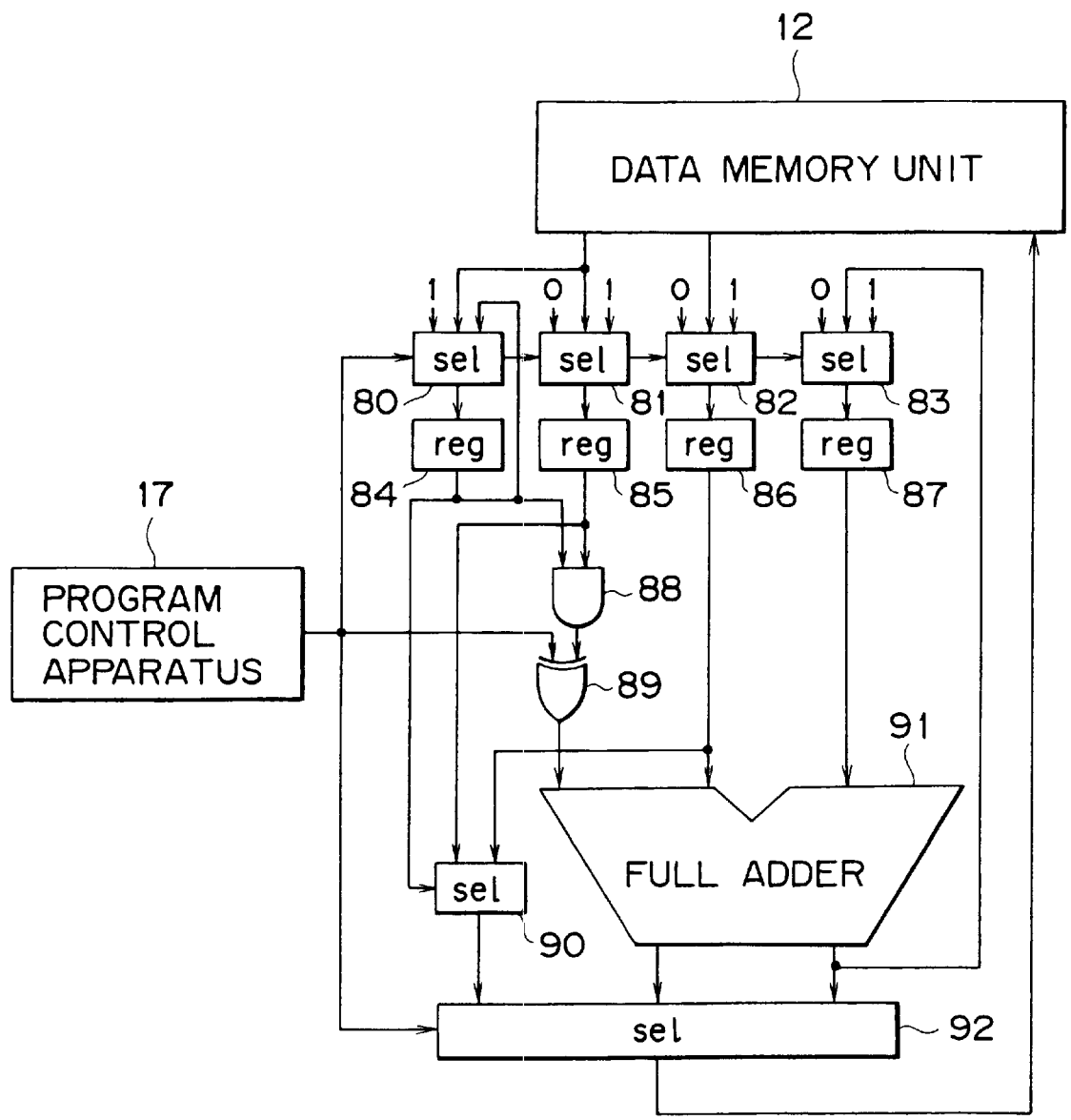
FIG. 2 is a block diagram showing a typical configuration of a processing circuit unit employed in the related art SIMD control parallel processor shown in FIG. 1.
Figure 3:
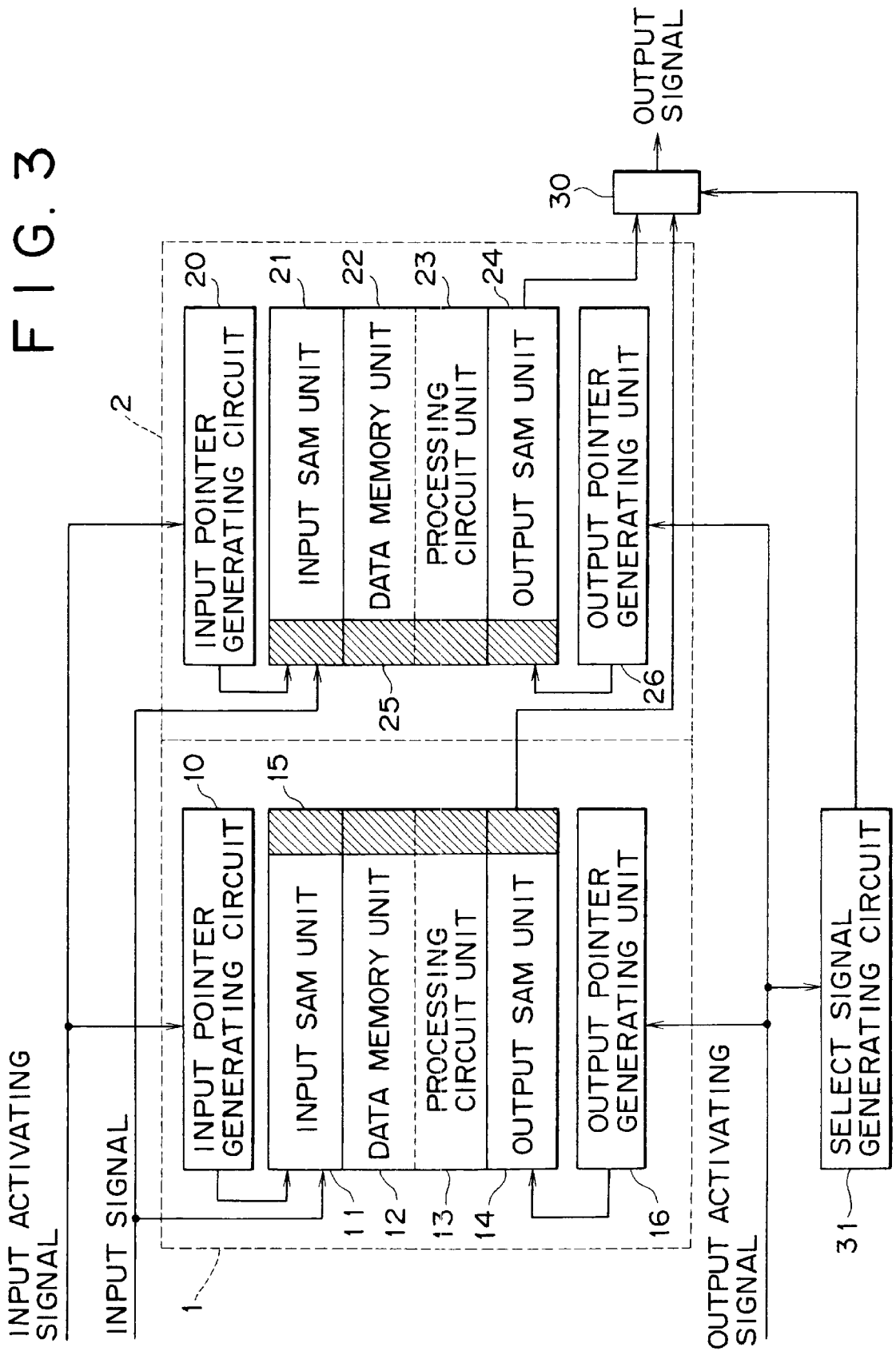
FIG. 3 is a block diagram showing a typical configuration of a data processing system according to the present invention.

FIG. 3 is a block diagram showing a typical configuration of a data processing system according to the present invention. Components corresponding to those employed in the SIMD control processor and the processing circuit unit shown in FIGS. 1 and 2 respectively are denoted by the same reference numerals as those in FIGS. 1 and 2, and their explanation is appropriately omitted. In the typical configuration shown in FIG. 3, two data processing apparatuses 1 and 2 are provided. An inputs signal is supplied to an input SAM unit 11 employed in the 2nd data processing apparatus 1 and an input SAM unit 21 of the 1st data processing apparatus 2. An input activating signal is supplied to input pointer generating circuits 10 and 20 employed in the data processing apparatuses 1 and 2 respectively. On the other hand, an output activating signal is supplied to output pointer generating circuits 16 and 26 employed in the data processing apparatuses 1 and 2 respectively. The output activating signal is supplied also to a select signal generating circuit 31. Data output from an output SAM unit 14 employed in the 2nd data processing apparatus 1 and data output from an output SAM unit 24 employed in the 1st data processing apparatus 2 are supplied to a selector 30 for selecting one of them in accordance with a select signal generated by a select signal generating circuit 31.

Figure 1:
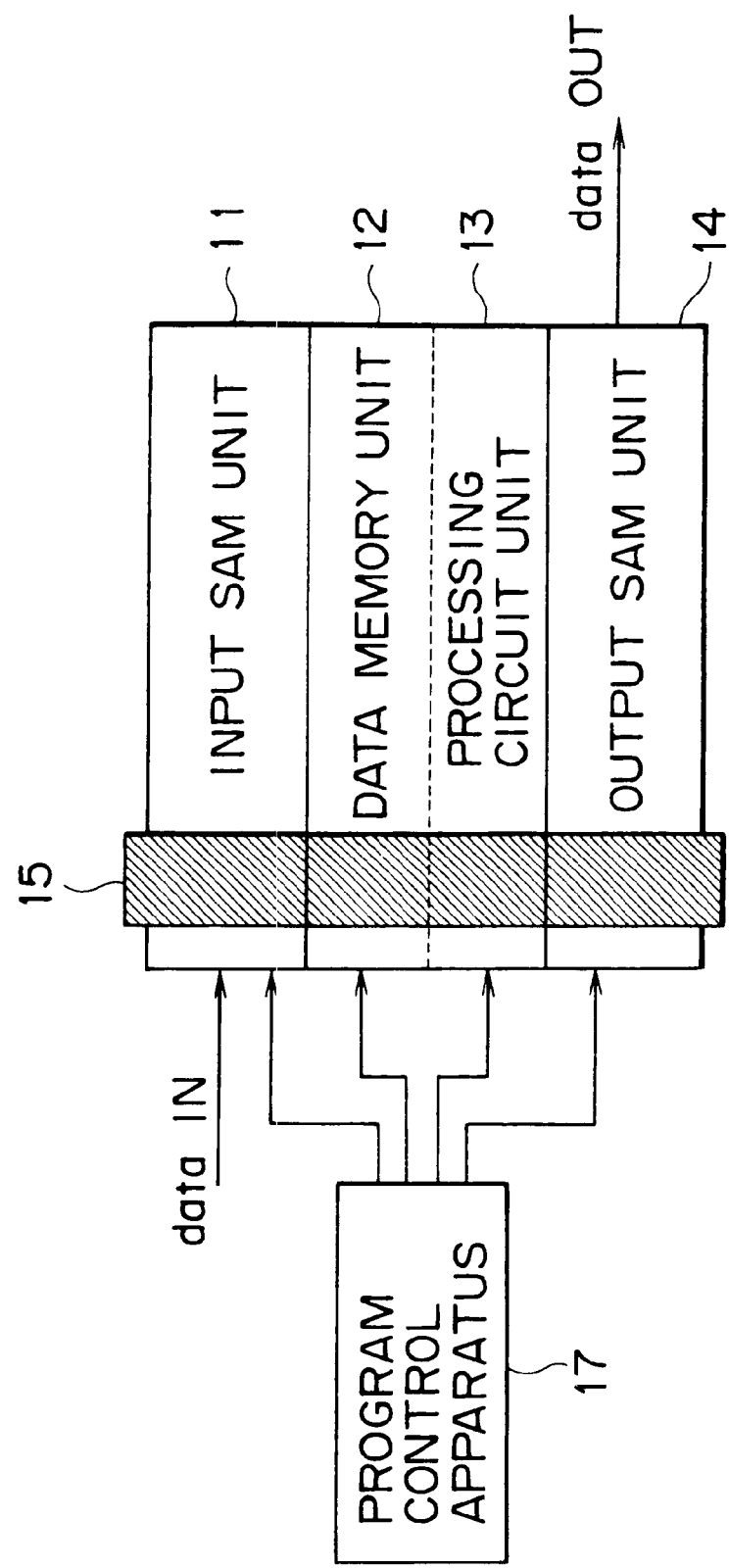
FIG. 1 is a block diagram showing a typical configuration of a related art SIMD control parallel processor.
Figure 4:
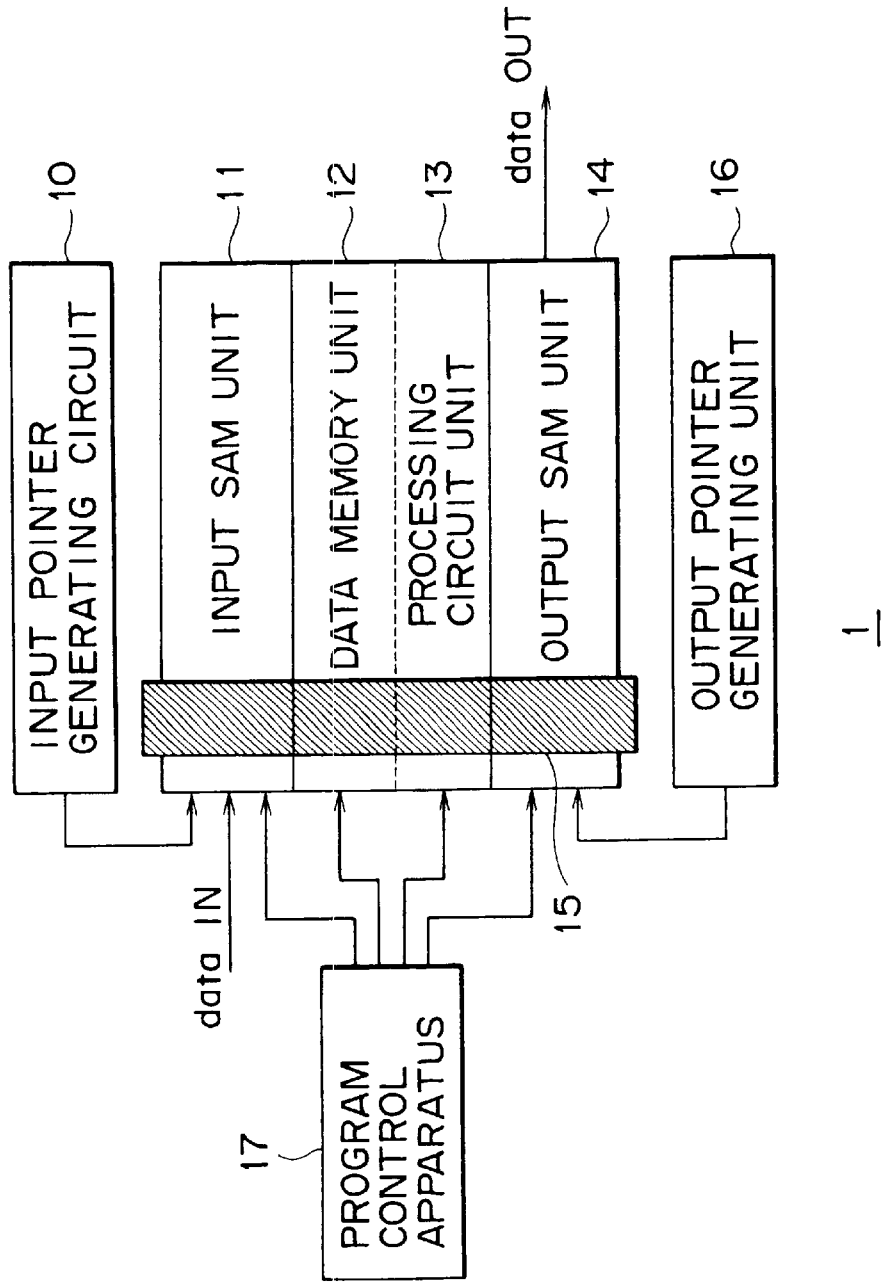
FIG. 4 is a block diagram showing a typical configuration of a 2nd data processing apparatus employed in the data processing system shown in FIG. 3.

In the typical configuration shown in FIG. 3, the 2nd data processing apparatus 1 also includes a program control apparatus 17 shown in FIG. 4 in addition to the components described above such as the input SAM unit 11 to the output SAM unit 14 as is the case with the related art data processing apparatus shown in FIG. 1. As described above, the 2nd data processing apparatus 1 is further provided with an input pointer generating apparatus 10 for generating a pointer specifying an input address in the input SAM unit 11 and the output pointer generating apparatus 16 for generating a pointer specifying an output address in the output SAM unit 14.

Similarly, the 1st data processing apparatus 2 has a configuration identical with that of the 2nd data processing apparatus 1. To put it in detail, the 1st data processing apparatus 2 also includes components such as the input pointer generating circuit 20 to a program control apparatus 27 which correspond to the input pointer generating circuit 10 to the program control apparatus 17 respectively employed in the 2nd data processing apparatus 1.

The components employed in the 2nd data processing apparatus 1, from the input SAM unit 11 to the output SAM unit 14, constitute a plurality of processor elements 15. Similarly, the components employed in the 1st data processing apparatus 2, from the input SAM unit 21 to the output SAM unit 24, constitute a plurality of processor elements 25.

FIG. 4 is a block diagram showing a typical configuration of the 2nd data processing apparatus 1. In this figure, the program control apparatus 17 which is omitted from FIG. 3 is shown. Even though not shown in any figure, the 1st data processing apparatus 2 also includes the program control apparatus 27.

Figure 5:
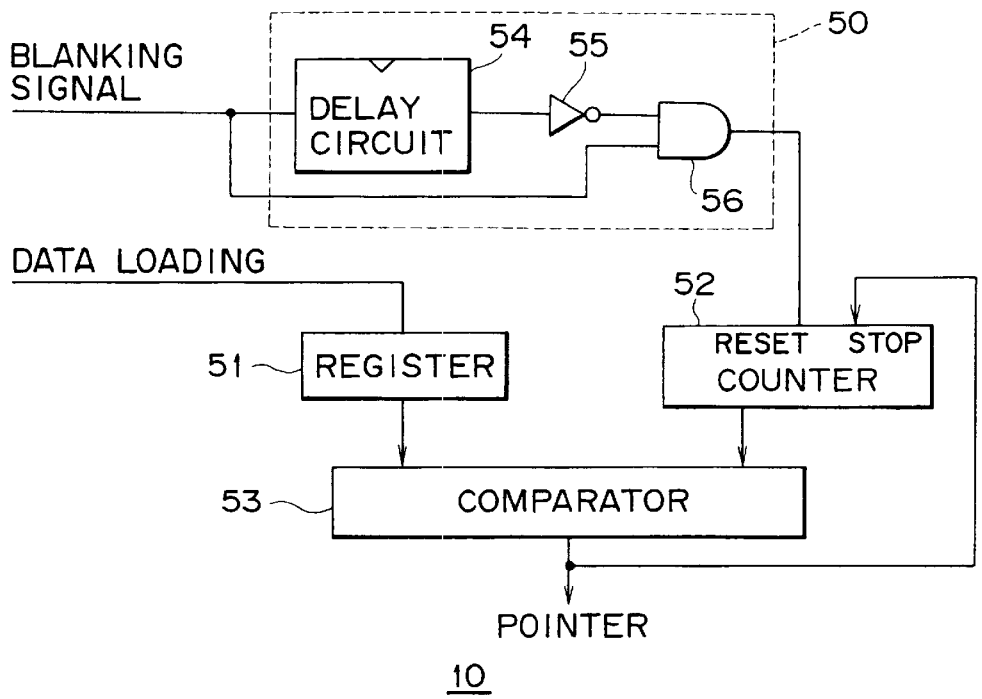
FIG. 5 is a block diagram showing a typical configuration of an input pointer generating circuit employed in the 2nd data processing apparatus shown in FIG. 4.

FIG. 5 is a block diagram showing a typical configuration of the input pointer generating circuit 10. Even though not shown in any figure, the output pointer generating circuit 20 has the same configuration as that of the input pointer generating circuit 10.

As shown in FIG. 5, a differentiation circuit 50 includes a delay circuit 54, an inverter 55 and an AND circuit 56. The delay circuit 54 receives a horizontal synchronization signal (a blanking signal), which is reset at an L level during a blanking period, from a circuit not shown in the figure. The blanking signal is supplied also to the AND circuit 56. The delay circuit 54 delays the blanking signal by one block before supplying the delayed blanking signal to the inverter 55. The inverter 55 inverts the logic of the signal supplied thereto, supplying the inverted signal to the AND circuit 56. The AND circuit 56 computes the logical product of the signal output by the inverter 55 and the blanking signal and supplies the logical product to a reset terminal of a counter 52.

Data corresponding to the delay time is loaded into a register 51 from an external apparatus. A comparator 53 compares the data stored in the register 51 with the contents of the counter 52 and outputs a result of the comparison to a stop terminal of the counter 52. Depending upon the result of the comparison, the counting operation of the counter 52 is halted and, at the same time, the comparator 53 outputs a pulse to a line pti of the input SAM unit 11 shown in FIG. 7 as a pointer.

Figure 6:
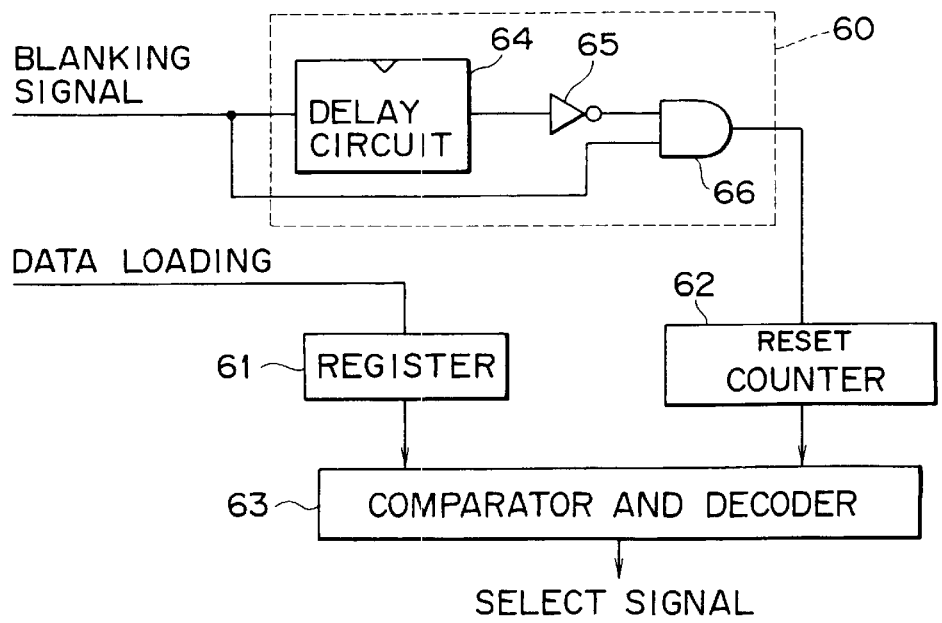
FIG. 6 is a block diagram showing a typical configuration of a select signal generating circuit employed in the data processing system shown in FIG. 3.

FIG. 6 is a block diagram showing a typical configuration of the select signal generating circuit 31. In the select signal generating circuit 31 shown in the figure, a differentiation circuit 60 includes a delay circuit 64, an inverter 65 and an AND circuit 66. The delay circuit 64 receives the blanking signal from a circuit not shown in the figure. The delay circuit 64 delays the blanking signal by one block before supplying the delayed blanking signal to the inverter 65. The inverter 65 inverts the logic of the signal supplied thereto, supplying the inverted signal to one of the input terminals of the AND circuit 66. The blanking signal is supplied also to the other input terminal of the AND circuit 66 as it is. The AND circuit 66 computes the logical product of the signal output by the inverter 65 and the blanking signal and supplies the logical product to a reset terminal of a counter 62. When a signal is supplied to the reset terminal, the counter 62 resets its contents to a zero and starts a counting operation. Data corresponding to the delay time is loaded into a register 61. A comparator & decoder 63 compares the data stored in the register 61 with the contents of the counter 62 and outputs a result of the comparison to a selector 30 as a select signal. The result of the comparison is typically the logic value 0 if the data stored in the register 61 is smaller than contents of the counter 62 or the logic value 1 if the data stored in the register 61 is greater than contents of the counter 62.

Figure 7:
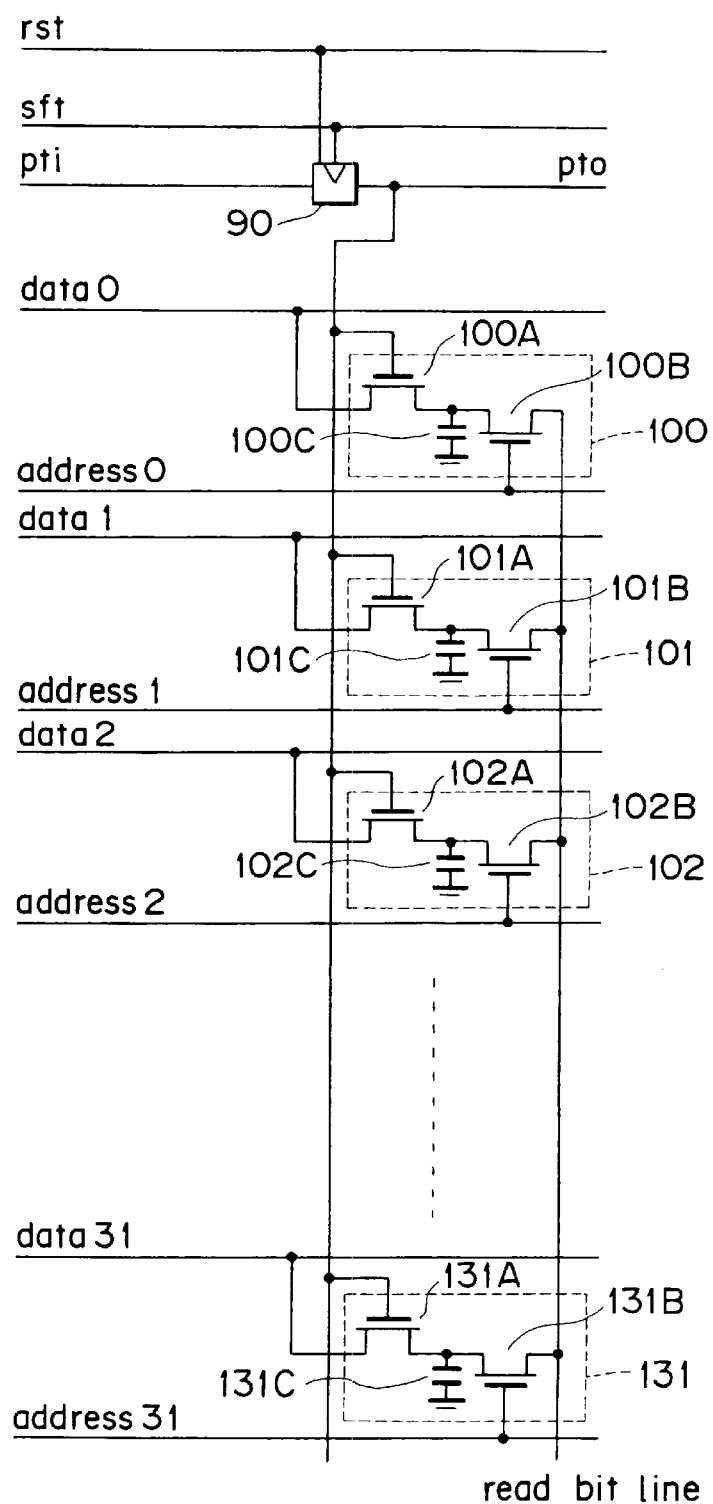
FIG. 7 is a block diagram showing a typical configuration of a one-word portion in a processor element in an input SAM unit employed in the 2nd data processing apparatus shown in FIG. 4.

FIG. 7 is a block diagram showing a typical configuration of a one-word portion in a processor element in the input SAM unit 11. As shown in the figure, one word (32 bits) of data are supplied in parallel to lines data0, data1, data2, . - - , data 31 which are connected to memory cells 100, 101, 102, . - - , 131 respectively. The memory cells 100, 101, 102, . - - , 131 include transistors 100A, 101A, 102A, - - - , 131A and transistors 100B, 101B, 102B, . - - , 131B respectively. The base of each of the transistors 100A, 101A, 102A, - - - , 131A is connected to a line pto for conveying the output of a shift register 90. The input terminals of the transistors 100A, 101A, 102A, - - - , 131A are connected to the lines data0, data1, data2, . - - , data 31 respectively. The output terminals of the transistors 100A, 101A, 102A, - - - , 131A are connected to capacitors 100C, 101C, 102C, - - - , 131C and to the input terminals of the transistors 100B, 101B, 102B, . - - , 131B respectively. The output terminals of the transistors 100B, 101B, 102B, . - - , 131B are connected to a read bit line. The bases of the transistors 100B, 101B, 102B, . - - , 131B are connected to address lines address0, address1, address2, . - - , address31 respectively.

A shift register 90 outputs data supplied thereto through the line pti to the line pto in synchronization with a clock signal supplied by a line sft. The contents of the shift register can be reset by a reset signal supplied thereto through a line rst.

Figure 8:
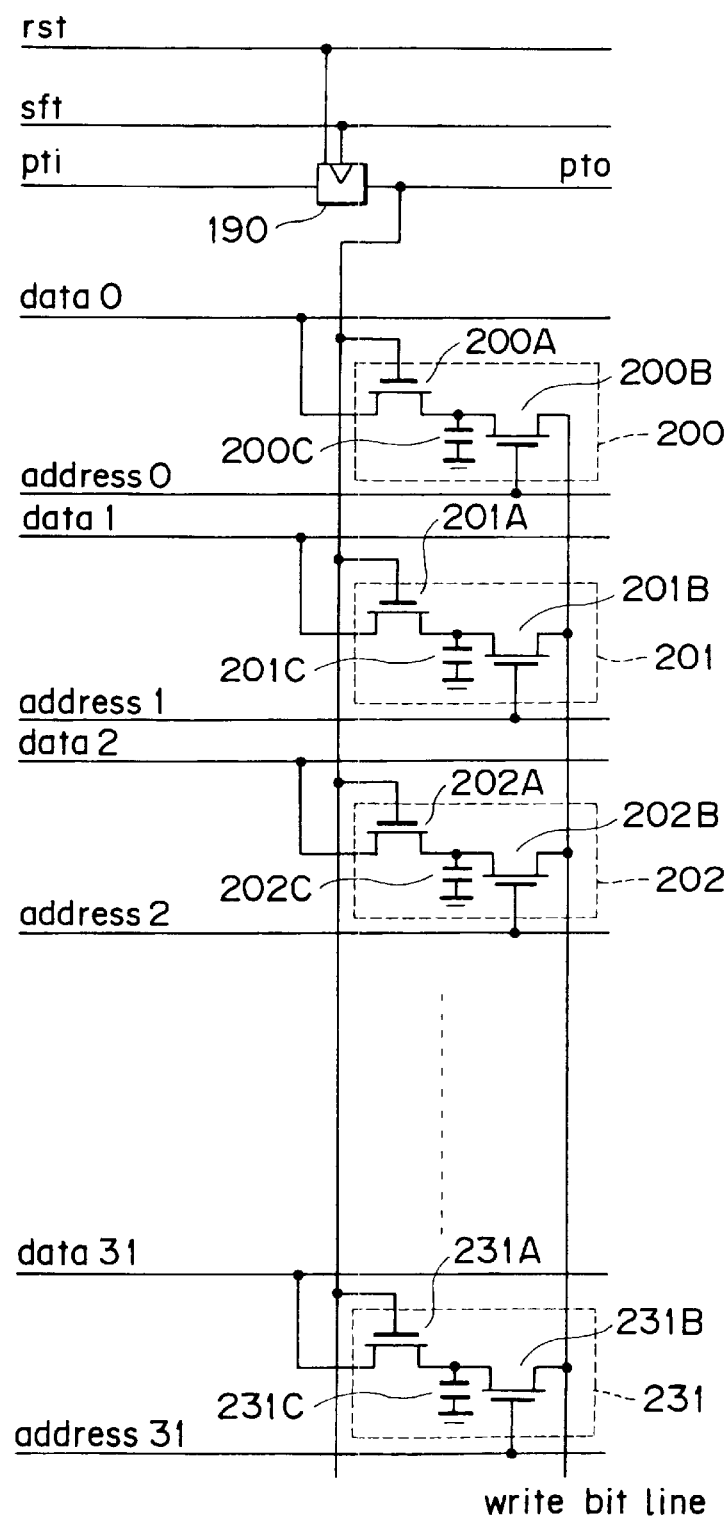
FIG. 8 is a block diagram showing a typical configuration of a one-word portion in a processor element in an output SAM unit employed in the 2nd data processing apparatus shown in FIG. 4.

FIG. 8 is a block diagram showing a typical configuration of the output SAM unit 14. As shown in the figure, the output SAM unit 14 includes a shift register 190, memory cells 200 to 231, transistors 200A to 231A, transistors 200B to 231B and capacitors 200C to 231C which constitute a configuration basically identical with that of the shift register 90, the memory cells 100 to 131, the transistors 100A to 131A, the transistors 100B to 131B and the capacitors 100C to 131C employed in the input SAM unit 11 shown in FIG. 7.

The difference between the input SAM unit 11 shown in FIG. 7 and the output SAM unit 14 shown in FIG. 8 is that, in the case of the former, data stored in parallel in word units in the capacitors 100C to 131C of the memory cells 100 to 131 from the lines data0 to data 131 respectively is read out sequentially in bit units through the read bit line while, in the case of the latter, data stored in the capacitors 200C to 231C of the memory cells 200 to 231 sequentially in bit units through a write bit line is read out in parallel in word units through the lines data0 to data31 respectively.

It should be noted that processing circuit units 13 and 23 each have the same configuration as the processing circuit unit shown in FIG. 2.

Next, the operation of the data processing system shown in FIG. 3 will be described. Assume that the data processing apparatuses 1 and 2 include M pieces of processor elements 15 and M pieces of processor elements 25 respectively. Also assume that an input signal conveying N pieces of data per horizontal scanning line is received in series with the pieces of data arriving sequentially where N>M. In this case, the number of adjacent processor elements 15 employed in the 2nd data processing apparatus 1 that can be used jointly to process their respective pieces of pixel data is L where (M−L) has to be at least N/2. Similarly, the number of adjacent processor elements 25 employed in the 1st data processing apparatus 2 that can be used jointly to process their respective pieces of pixel data is L.

For the sake of convenience, in the following description, the configurations of the input pointer generating circuit 16 and the output pointer generating circuits 20 and 26 are exactly the same as the configuration of the input pointer generating circuit 10 shown in FIG. 5. In the case described above, the contents of the registers 51 employed in the input and output pointer generating circuits 10 and 16 are each set at 0 whereas the contents of the registers 51 employed in the input and output pointer generating circuits 20 and 26 are each set at a value (M−2L). In addition, the contents of the register 61 employed in the select signal generating circuit 31 shown in FIG. 6 are set at a value (M−L).

For the sake of simplification, assume that M=10, N=16 and L=2.

In this case, when the blanking signal supplied to the input pointer generating circuit 10 shown in FIG. 5 is set at an H level, 16 pieces of pixel data P1 to P16 are supplied sequentially. The blanking signal is reset to an L level to indicate the start of a horizontal fly-back period during which no pixel data is supplied. In other words, the supplying of pixel data is started with timing of inversion of the blanking signal from the L level to the H level.

In the differentiation circuit 50, after being delayed by the delay circuit 54 by one clock, the blanking signal is inverted by the inverter 55. The AND circuit 56 computes the logic product of the output of the inverter 55 and the blanking signal and outputs a pulse having a width of one clock with timing of a transition of the blanking signal from the L level to the H level. The pulse resets the counter 52 which then starts to count up the number of clocks.

The counter 52 increments its contents by one for each clock supplied thereto. The comparator 53 compares the contents of the counter 52 with the contents of the register 51. The comparator 53 outputs a pulse pointer for triggering an operation to read in data when the contents of the counter 52 match the contents of the register 51 to the input SAM unit 11. Since the contents of the register 51 have been set at 0, the comparator 53 outputs a pulse as soon as the contents of the counter 52 are reset. After the pulse have been output, however, the outputting of the pulse pointer is inhibited.

The pulse pointer output by the comparator 53 is supplied to the shift register 90 employed in the input SAM unit 11 shown in FIG. 7 through the line pti. The contents of the shift register 90 are output sequentially to a circuit at the following stage in synchronization with a clock signal through the line pto. In the input SAM unit 11 of each processor element 15, when the output of the shift register 90 is set at the H level, the transistors 100A to 131A employed in the memory cells 100 to 131 are turned on, allowing data of one word supplied from the lines data0 to data 31 to be accumulated in the capacitors 100C to 131C of the memory cells 100 to 131 respectively.

The operation described above is carried out in the same way in each of the processor elements 15. As a result, when the pieces of pixel data P1 to P16 are supplied to the data processing system, the pieces of pixel data P1 to PM where M=10 are held in the 2nd data processing apparatus 1.

On the other hand, the contents of the register 51 employed in the input pointer generating circuit 20 of the 1st data processing apparatus 2 are set at 6 (=M-2L=10-4). Much like the input pointer generating circuit 10, the comparator 53 outputs a pulse pointer for triggering an operation to read in data when the contents of the counter 52 match the contents of the register 51 to the input SAM unit 21. As a result, the pieces of pixel data P7, P8, P9, . - - , P16 of the later part of the input signal are held in the input SAM units 21 of the respective processor elements 25 employed in the 1st data processing apparatus 2.

The data held in the input SAM units 11 and 21 as described above is then transferred to the data memory units 12 and 22 respectively to be stored therein before being further transferred to the processing circuit units 13 and 23 respectively to undergo predetermined processing.

In the processing carried out by the processing circuit unit 13 of the 2nd data processing apparatus 1, L adjacent pieces of pixel data where L=2 are manipulated as described above. In the case of the rightmost processor element 15, however, there is no piece of pixel data on the right side to be processed along with the piece of pixel data for the rightmost processor element 15 as is obvious from FIG. 3. As a result, the result of processing is not accurate.

Similarly, in the processing carried out by the processing circuit unit 23 of the 1st data processing apparatus 2 shown in FIG. 3, two adjacent pieces of pixel data are manipulated. In the case of the leftmost processor element 25, however, there is no piece of pixel data on the left side to be processed along with the piece of pixel data for the leftmost processor element 25. As a result, the result of processing is not accurate.

In the present embodiment, however, both the data processing apparatuses 1 and 2 redundantly process part of the input signal, that is, the four pieces of pixel data P7 to P10 as described above, allowing only results of processing each with an accurate value to be output.

To put it in detail, the comparator 53 of the output pointer generating circuit 16 employed in the 2nd data processing apparatus 1 generates a pointer so that all processing results Q1 to Q10 produced by the ten processor elements 15 respectively are output. Similarly, the comparator 53 of the output pointer generating circuit 26 employed in the 1st data processing apparatus 2 generates a pointer so that all processing results Q7 to Q16 produced by the ten processor elements 25 respectively are output.

As a result, the processing results Q1, Q2, Q3, . - - , Q10 are output from the output SAM unit 14 of the 2nd data processing apparatus 1 and the processing results Q7, Q8, Q9, . - - , Q16 are output from the output SAM unit 24 of the 1st data processing apparatus 2 as shown in FIG. 9. The processing results are all supplied to the selector 30 employed in the data processing system shown in FIG. 3. In particular, the processing results Q7, Q8, Q9 and Q10 are supplied from both the data processing apparatuses 1 and 2 to the selector 30 with the same timing.

The contents of the register 61 employed in the select signal generating circuit 31 shown in FIG. 6 are set at 8 (=M-L=10-2) as described above. The comparator & decoder 63 compares the data stored in the register 61, that is, the value 8, with the contents of the counter 62 and outputs a result of the comparison to the selector 30 as a select signal. To be more specific, the result of the comparison is typically the logic value 0 if the data stored in the register 61 is greater than contents of the counter 62 or the logic value 1 if the data stored in the register 61 is smaller than contents of the counter 62. When the select signal has the logic value 0, the selector 30 of the data processing system shown in FIG. 3 selects the processing result generated by the output SAM unit 14 employed by the 2nd data processing apparatus 1. When the select signal has the logic value 0, on the other hand, the selector 30 selects the processing result generated by the output SAM unit 24 employed by the 1st data processing apparatus 2. Thus, the inaccurate rightmost processing results Q9 and Q10 produced by the 2nd data processing apparatus 1 and the inaccurate leftmost processing results Q7 and Q8 produced by the 1st data processing apparatus 2 are eliminated as shown in FIG. 9. As a result, the processing results Q1, Q2, Q3, . - - , Q16 are finally output as accurate data.

Normally, the data processing apparatuses 1 and 2 are each built as an IC which is capable of processing data only internally, traditionally making it necessary to exchange data between the data processing apparatuses 1 and 2. In the case of the data processing system according to the present invention, however, it is not necessary to output received pixel data. To be more specific, it is not necessary to exchange data between the data processing apparatuses 1 and 2. As a result, it is possible to avoid the processing speed from decreasing due to the exchange of data.

It should be noted that the technical term 'system' used in this specification represents a general configuration including a plurality of apparatuses.

As described above, two data processing apparatuses are connected to each other in the embodiment of the present invention. It is worth noting that the number of connected data processing apparatuses can be increased as the piece count of pixel data to be processed rises.

While the preferred embodiment of the present invention has been described using the specific terms, such description is for illustrative purposes only, and it is to be understood that changes and variations may be made without departing from the spirit or scope of the following claims.

What is claimed is:

1. A data processing system including data processing apparatuses each having a plurality of processing elements, each of said processing elements including an input unit for inputting input serial data, a processing unit for processing data input by said input unit, and an output unit for outputting results of processing carried out by said processing unit, said data processing system comprising:

an input delaying means for causing an operation carried out by said input unit employed in a $1^{st}$ one of said data processing apparatuses for inputting serial data to lag behind an operation carried out by said input unit employed in a $2^{nd}$ one of said data processing apparatuses for inputting serial data by such a time delay that part of said input serial data is supplied to both said $1^{st}$ data processing apparatus and said $2^{nd}$ data processing apparatus; and an output delaying means for causing an operation carried out by said output unit employed in said $1^{st}$ data processing apparatus for outputting serial data to lag behind an operation carried out by said output unit employed in said $2^{nd}$ data processing apparatus for outputting serial data.

2. A data processing system according to claim 1 wherein said input delaying means comprises:

a means for counting clocks synchronized with serial data input by said input unit;

a means for holding data representing a clock count corresponding to a respective time delay; and a means for comparing contents of said clock counting means with contents of said data holding means and for controlling an operation carried out by said input unit to input serial data in accordance with a result of comparing said contents.

3. A data processing system according to claim 1 wherein said output delaying means comprises:

a means for counting clocks synchronized with serial data output by said output unit;

a means for holding data representing a clock count corresponding to a respective time delay; and a means for comparing contents of said clock counting means with contents of said data holding means and for controlling an operation carried out by said output unit to output serial data in accordance with a result of comparing said contents.

4. A data processing system according to claim 1 wherein said data processing apparatuses are each an SIMD control parallel processor.

5. A data processing method to be adopted in a data processing system including a plurality of data processing apparatuses each having a plurality of processing elements, each of said processing elements including an input unit for inputting input serial data, a processing unit for processing data input by said input unit, and an output unit for outputting results of processing carried out by said processing unit, said data processing method comprising the steps of:

causing an operation carried out by said input unit employed in a $1^{st}$ one of said data processing apparatuses for inputting serial data to lag behind an operation carried out by said input unit employed in a $2^{nd}$ one of said data processing apparatuses for inputting serial data by such a time delay that part of said input serial data is supplied to both said $1^{st}$ data processing apparatus and said $2^{nd}$ data processing apparatus; and causing an operation carried out by said output unit employed in said $1^{st}$ data processing apparatus for outputting serial data to lag behind an operation carried out by said output unit employed in said $2^{nd}$ data processing apparatus for outputting serial data.

* * * * *